United States Patent
Goldwin et al.

(10) Patent No.: US 12,427,953 B2
(45) Date of Patent: Sep. 30, 2025

(54) WHEEL CHOCK MOUNTING ASSEMBLY

(71) Applicant: Caterpillar Inc., Peoria, IL (US)

(72) Inventors: Nirmal Goldwin, Bangalore (IN); Sriharsha Hebbani Nagaraja, Tasmania (AU); Robert Harding, Tasmania (AU)

(73) Assignee: Caterpillar Inc., Peoria, IL (US)

( * ) Notice: Subject to any disclaimer, the term of this patent is extended or adjusted under 35 U.S.C. 154(b) by 491 days.

(21) Appl. No.: 17/843,514

(22) Filed: Jun. 17, 2022

(65) Prior Publication Data

US 2022/0402466 A1     Dec. 22, 2022

(30) Foreign Application Priority Data

Jun. 21, 2021   (AU) ................................ 2021204152

(51) Int. Cl.
    *B60T 3/00*         (2006.01)
(52) U.S. Cl.
    CPC ...................... *B60T 3/00* (2013.01)
(58) Field of Classification Search
    CPC .......................................................... B60T 3/00
    USPC .................................................. 188/4 R, 32
    See application file for complete search history.

(56) References Cited

U.S. PATENT DOCUMENTS

| | | |
|---|---|---|
| 5,738,260 A | 4/1998 | Kirtland |
| 7,036,637 B1 | 5/2006 | Wiens |
| 9,688,253 B1 | 6/2017 | Colby |
| 10,518,718 B2 | 12/2019 | Piraino |
| 2018/0313151 A1 | 11/2018 | Ellement |
| 2021/0366323 A1* | 11/2021 | Buell ............... G09F 21/049 |

FOREIGN PATENT DOCUMENTS

| | | | |
|---|---|---|---|
| CN | 204415363 | 6/2015 | |
| DE | 10209162 A1 * | 9/2003 | ............ B60P 3/077 |
| DE | 102007062582 A1 | 5/2008 | |
| DE | 102011109462 | 2/2013 | |
| DE | 102014009053 A1 | 12/2015 | |
| EP | 2397392 B1 | 2/2015 | |
| EP | 2957484 B1 | 3/2017 | |
| EP | 3795434 A1 * | 3/2021 | ............... B60T 3/00 |
| GB | 2521529 | 6/2015 | |
| GB | 2521529 A * | 6/2015 | ............... B60T 3/00 |
| JP | 62192954 | 12/1987 | |
| KR | 200329884 Y1 | 2/2004 | |
| KR | 2020170003064 U | 8/2017 | |

* cited by examiner

*Primary Examiner* — Christopher P Schwartz (57) ABSTRACT

A wheel chock mounting assembly includes a bracket and a stopper. The bracket has a retention member and is configured to be coupled to a surface of a machine. The bracket defines a receptacle to at least partially receive a wheel chock at a predefined location on the machine. The stopper has an engagement member. The stopper is configured to be mounted on the machine at a predefined distance from the bracket. The bracket and the stopper are structured and arranged to receive and constrain the wheel chock therebetween at the predefined location on the machine.

8 Claims, 8 Drawing Sheets

WHEEL CHOCK MOUNTING ASSEMBLY

CROSS-REFERENCE TO RELATED APPLICATION

This application claims priority under 35 USC § 119 and the Paris Convention to Australian Patent Application No. 2021204152 filed on Jun. 21, 2021.

TECHNICAL FIELD

The present disclosure relates to a wheel chock mounting assembly for a machine. More particularly, the present disclosure relates to a wheel chock mounting assembly that is ergonomic to be accessed and used for the mounting of a wheel chock, and which is located at a machine portion that remains largely free from any interference.

BACKGROUND

In environments, such as underground mining, it is common to provide a chock for traction devices (e.g., wheels) of machines, such as an underground wheel loader. A chock is commonly inserted and positioned into a gap divergent from a region of contact between the traction device and the underlying ground surface such that the chock may engage both the underlying ground surface and the traction device to arrest any undue motion of the traction device (or the machine) with respect to the underlying ground surface.

A chock may be provided in easy access to an operator of the machine so that the operator can access and use them readily, as and when required. For this purpose, end customers or machine dealers generally customize the mount and the location for the chock and install them at portions of the machine according to their discretion. While such customization may make the chock easily accessible to the operator, it fails to take into account situations where the chock or the associated mount for the chock may interfere with one or more functions, parts, or surroundings of the machine. Neither do such customization practices take into account operator or human ergonomics and ease of use.

Korean Application 20170003064 ('064 reference) relates to a structure to detach and attach a chock to a mudguard fender of a machine. The machine may be a wheel loader. The '064 reference also provides a step function that allows the driver to step on and off, in turn enabling the driver to safely move with respect to a cabin of the machine.

Reference to any prior art in the specification is not an acknowledgement or suggestion that this prior art forms part of the common general knowledge in any jurisdiction or that this prior art could reasonably be expected to be combined with any other piece of prior art by a skilled person in the art.

SUMMARY OF THE INVENTION

In one aspect, the disclosure is directed to a wheel chock mounting assembly. The wheel chock mounting assembly includes a bracket and a stopper. The bracket has a retention member and is configured to be coupled to a surface of a machine. The bracket defines a receptacle to at least partially receive a wheel chock at a predefined location on the machine. The stopper has an engagement member. The stopper is configured to be mounted on the machine at a predefined distance from the bracket. The bracket and the stopper are structured and arranged to receive and constrain the wheel chock therebetween at the predefined location on the machine.

In another aspect, the disclosure relates to a machine. The machine includes a fender and a wheel chock mounting assembly. The fender at least partially surrounds a wheel of the machine and defines a surface. The wheel chock mounting assembly includes a bracket and a stopper. The bracket has a retention member and is coupled to the surface. The bracket defines a receptacle to at least partially receive a wheel chock at a predefined location on the machine. The stopper has an engagement member and is mounted at a predefined distance from the bracket. Further, the bracket and the stopper are structured and arranged to receive and constrain the wheel chock therebetween at the predefined location on the machine.

In yet another aspect, the disclosure is directed to a method for mounting a wheel chock mounting assembly to a machine. The method includes locating a surface on the machine; coupling a bracket to the surface, where the bracket has a retention member and defines a receptacle to at least partially receive a wheel chock at a predefined location on the machine; and mounting a stopper at a predefined distance from the bracket. The stopper has an engagement member. Moreover, the bracket and the stopper are structured and arranged to receive and constrain the wheel chock therebetween at the predefined location on the machine.

By way of clarification and for avoidance of doubt, as used herein and except where the context requires otherwise, the term "comprise" and variations of the term, such as "comprising", "comprises" and "comprised", are not intended to exclude further additions components, integers or steps.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts.

Figure 1:
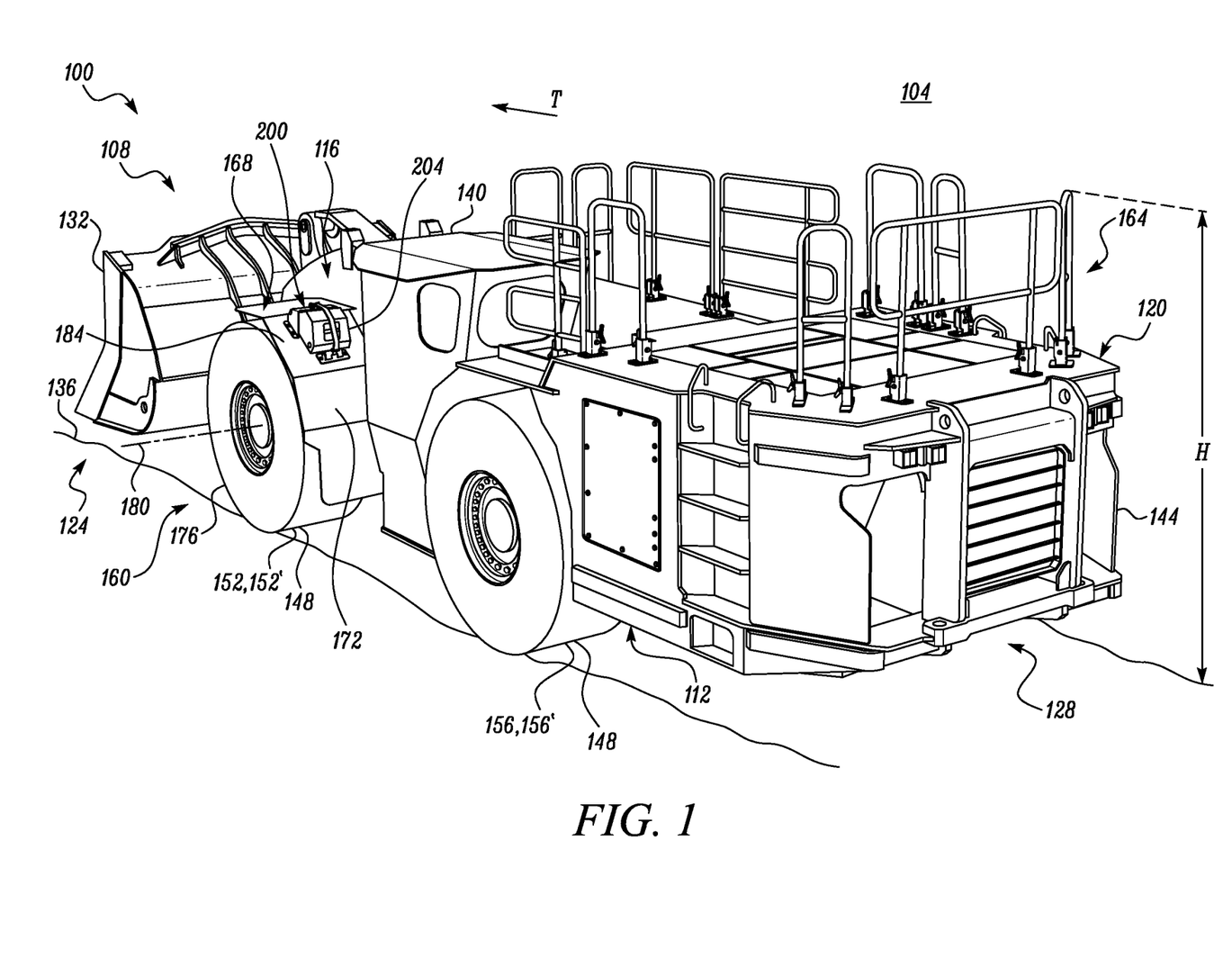
FIG. 1 is a perspective rear side view of an exemplary machine having a fender assembly, in accordance with one or more aspects of the present disclosure.

Referring to FIG. 1, a machine 100 is shown. The machine 100 may be applied in a mining environment 104, which may be an underground mining environment. It is possible for the machine 100 to be applied in other environments, such as over ground mining, construction, and transportation. The machine 100 may embody a load-haul-dump (LHD) machine 108, as exemplarily shown. Further, the machine 100 may be either partly or fully powered by the combustion of fossil fuels, although it is possible for the machine 100 to be either partly or fully powered by electricity. The machine 100 may include a main frame assembly 112 that may include a split frame configuration enabling the machine 100 to acquire a forward portion 116 and a rearward portion 120 that are articulable with respect to each other (e.g., at a hitch joint) (not shown). The forward portion 116 may define a forward end 124 of the machine 100, while the rearward portion 120 may define a rearward end 128 of the machine 100.

The forward portion 116 of the machine 100 may include an implement 132 by which an underlying ground surface 136 on which the machine 100 moves may be altered or modified. Alternatively, materials deposited on such an underlying ground surface 136 may be scooped and received into the implement 132 to be hauled—in the present embodiment, the implement 132 may include a bucket that may be movable or articulable so as to receive the materials so as to haul the materials. The rearward portion 120 of the machine 100 may include an operator cabin 140 and a power compartment 144 of the machine 100. The operator cabin 140 may be configured to house and station one or more operators of the machine 100, and may also include multiple input and output devices (e.g., joysticks, levers, control panels, touchscreens, etc.) (not shown) for the control of the many functions of the machine 100, e.g., machine motion and implement actuation.

Further, the machine 100 may include one or more traction devices, such as wheels 148. As an example, the machine 100 includes a set of forward wheels 152 and a set of rearward wheels 156, 156. The forward wheels 152 may be disposed towards the forward end 124 of the machine 100, while the rearward wheels 156 may be disposed towards the rearward end 128 of the machine 100. Only one forward wheel (i.e., forward wheel 152') and one rearward wheel (i.e., rearward wheel 156') is visible in the orientation of the machine 100 in FIG. 1. As shown, both the forward wheel 152' and the rearward wheel 156' are disposed towards a left hand side 160 of the machine 100, while the forward wheel and the rearward wheel disposed towards a right hand side 164 of the machine 100 are the ones which are not visible in the orientation of the machine 100 in FIG. 1.

While discussion in the present disclosure are generally directed towards the machine 100, which may be the LHD machine 108, it will be appreciated that one or more aspects of these discussions may also be applicable to other machines that may be supported and driven on traction devices, such as the forward wheels 152. The representation of the LHD machine 108 also need to be viewed as a non-limiting example, and the machine 100 may represent other types of the LHD machine 108.

Further, unless specified otherwise, terms such as 'forward', 'front', 'rear', 'rearward', as may be used in the present disclosure may be understood according to an exemplary direction, T, in which the machine 100 may move during operations. Said exemplary direction, T, is defined from the rearward end 128 towards the forward end 124 of the machine 100. Further, terms, such as 'left', 'right', 'top', 'bottom' 'upper', 'lower', and similar terms, may also be used in the present disclosure, and may be understood when viewing the machine 100 from the rearward end 128 towards the forward end 124 (i.e., along the exemplary direction, T).

Figure 2:
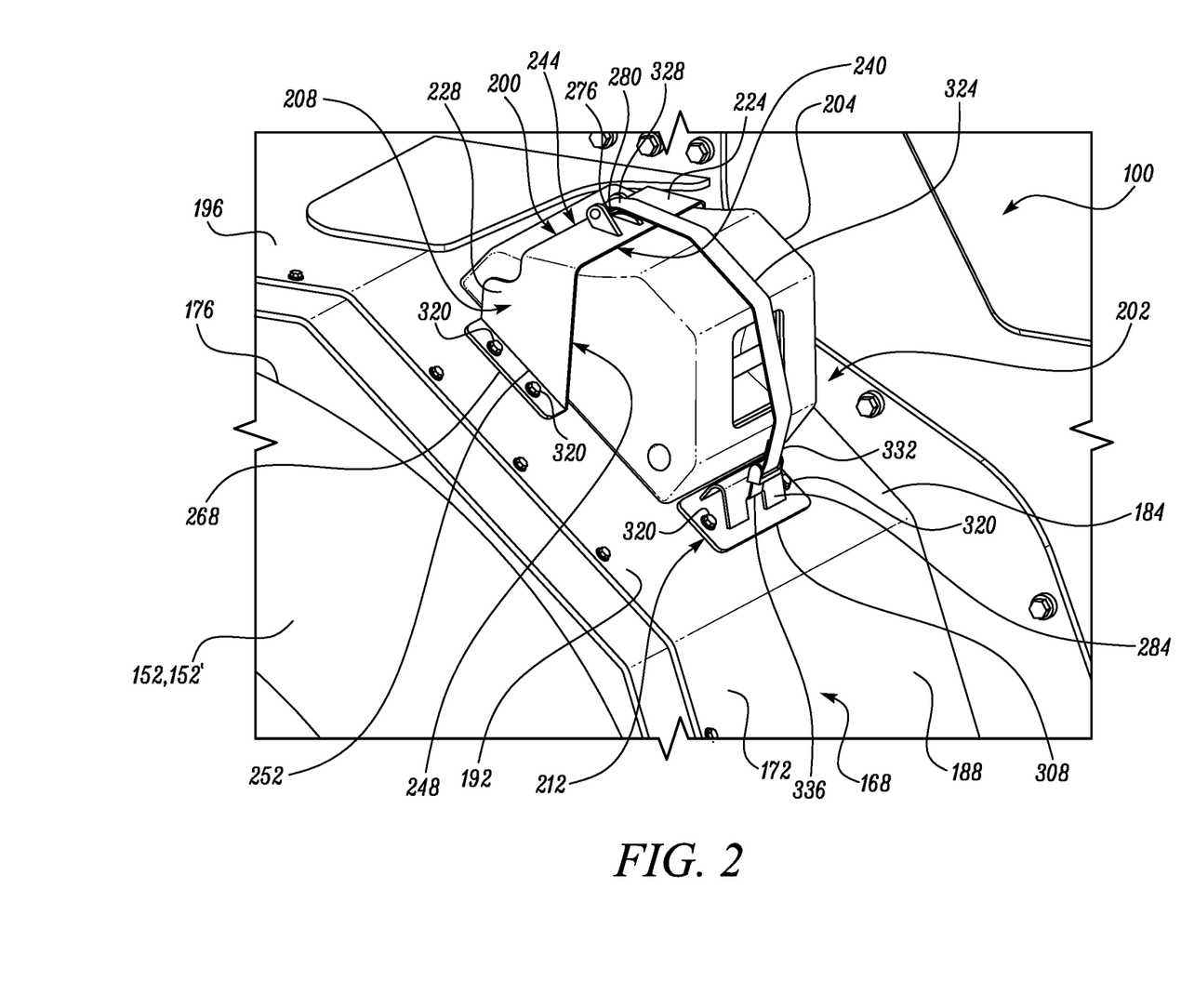
FIG. 2 is a close-up view of the fender assembly having a fender and a wheel chock mounting assembly mounted on the fender, in accordance with one or more aspects of the present disclosure.
Figure 6:
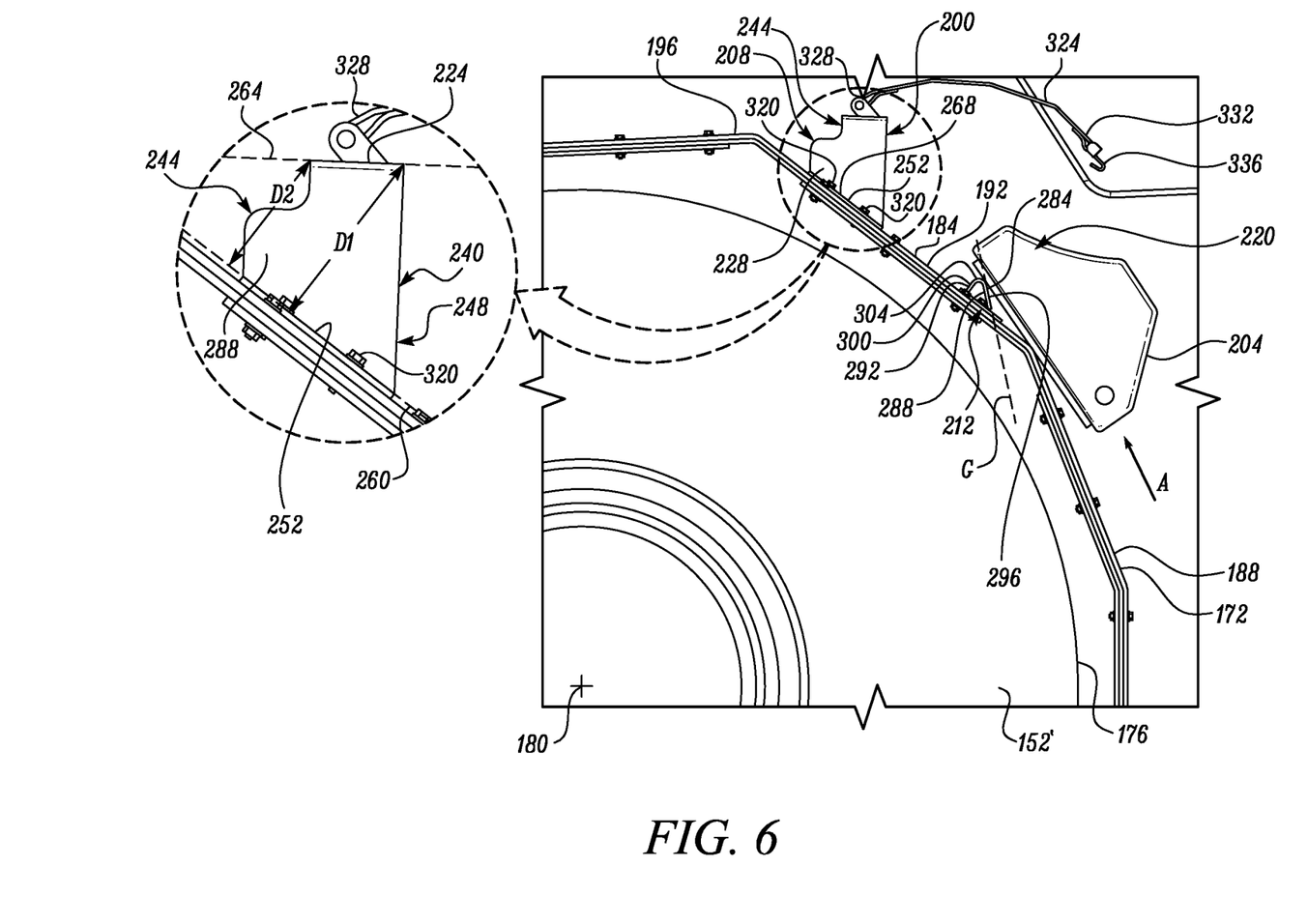
FIGS. 6 to 8 are views indicating an exemplary mounting process of the wheel chock to the wheel chock mounting assembly, in accordance with one or more aspects of the present disclosure.
Figure 7:
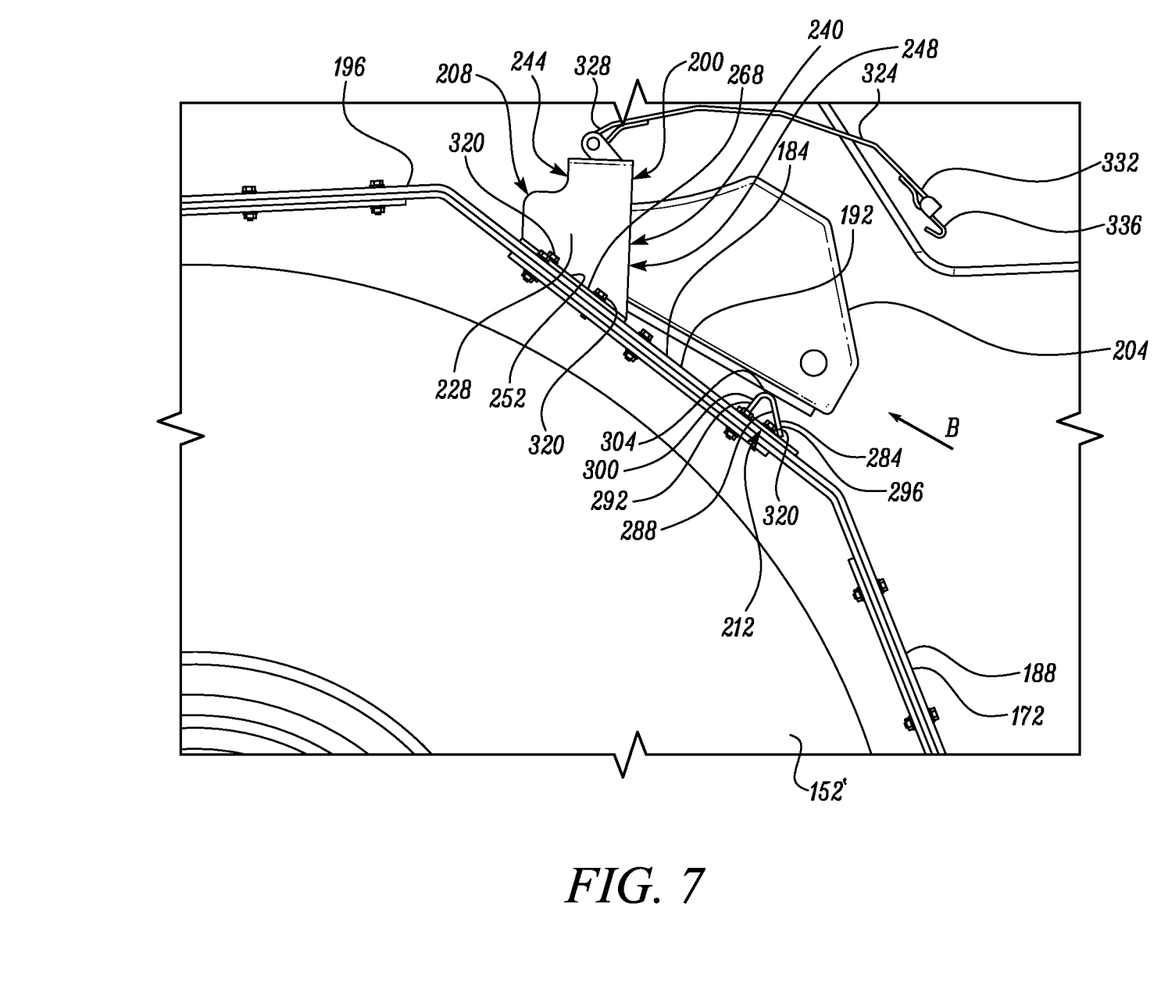
Figure 8:
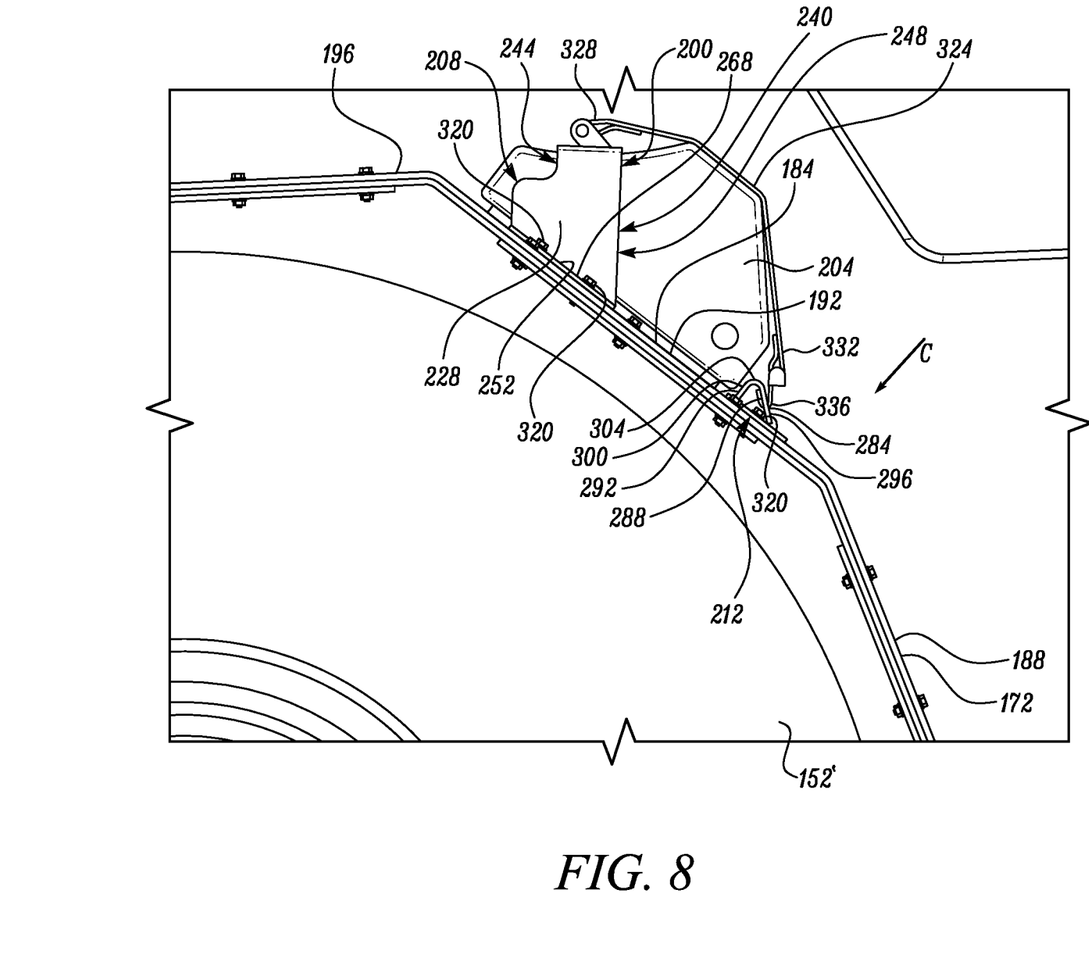

Referring to FIGS. 1 and 2, in conjunction with FIGS. 6, 7, and 8, the machine 100 includes a fender assembly 168 for the forward wheel 152'. A similar fender assembly (not visible) may also be available for the forward wheel that is disposed towards the right hand side 164 of the machine 100. Discussions related to the fender assembly 168 may also be applicable for the fender assembly for the forward wheel disposed towards the right hand side 164 of the machine 100. The fender assembly 168 includes a fender 172, details related to which are set out below. For ease, the forward wheel 152' will be referred to as a wheel 152', hereinafter.

The fender 172 at least partially surrounds the wheel 152'. In other words, the fender 172 at least partially runs or spans around a circumferential profile or a circular profile 176 of the wheel 152', i.e., around an axis 180 defined by the wheel 152' (see FIG. 6). Further, the fender 172 defines a surface 184. The surface 184 is disposed or directed away from the wheel 152'. In some embodiments, the surface 184 may be disposed angularly with respect to a height, H, (see FIG. 1) of the machine 100 and may be positioned at least halfway above the circular profile 176 defined by the wheel 152' (best visualizable in FIG. 6).

As an exemplarily structure of the fender 172, the fender 172 may define multiple portions, for example, the fender 172 may include a first portion 186, a second portion 192, and a third portion 196, as shown (see FIGS. 6 to 8). The second portion 192 may extend between the first portion 188 and the third portion 196. Additional portions and panels may be present on the fender 172, but they are not discussed, as they may be customary and/or may be contemplated by someone of skill in the art.

The first portion 188 may extend generally (i.e., not necessarily strictly) along the height, H, of the machine 100; the second portion 192 may extend generally obliquely from the first portion 188; and the third portion 196 may extend generally obliquely from the second portion 192. An overall profile attained by the first portion 188, second portion 192, and the third portion 196 of the fender 172, may generally conform and/or follow a curvature defined by the circular profile 176 of the wheel 152'. Further, in some embodiments, the third portion 196 may be disposed generally orthogonally with respect to the first portion 188 and/or may be generally disposed at a right angle with respect to the height, H, of the machine 100. Further, the second portion 192 and the third portion 196, along with the first portion 188 (either partly or fully), may be disposed at least halfway above the circular profile 176 defined by the wheel 152', with the surface 184 of the fender 172 being defined on the second portion 192 of the fender 172 (see FIGS. 6 to 8).

The term 'generally' or 'general', as used in the present disclosure, is applied to account for one or more of manufacturing tolerances, variations arising out of aesthetic or design considerations, spatial constraints, machine surroundings, and the like, as they may be applicable in actual application, and is simply used herein to indicate one or more non-limiting examples for the configuration of the fender 172. Therefore, the configuration and structure of the fender 172 as has been discussed above need to be viewed as exemplary.

With continued reference to FIG. 2 and in conjunction with FIGS. 6, 7, and 8, the machine 100 further includes a wheel chock mounting assembly 200, The wheel chock mounting assembly 200 facilitates a wheel chock 204 to be mounted at a predefined location 202 (see FIG. 2) on the machine 100. The wheel chock 204 may be applied to restrict or arrest a motion of the machine 100 with respect to the underlying ground surface 136. According to an example, the wheel chock 204 may be inserted and seated into a gap (not shown) divergent from a region of contact between the wheel 152' and the underlying ground surface 136 such that the wheel chock 204 may engage both the underlying around surface 136 and the wheel 152' to arrest any motion of the wheel 152' (or the machine 100) with respect to the underlying ground surface 136. The wheel chock mounting assembly 200 includes a bracket 208 and a stopper 212, as shown.

Figure 3:
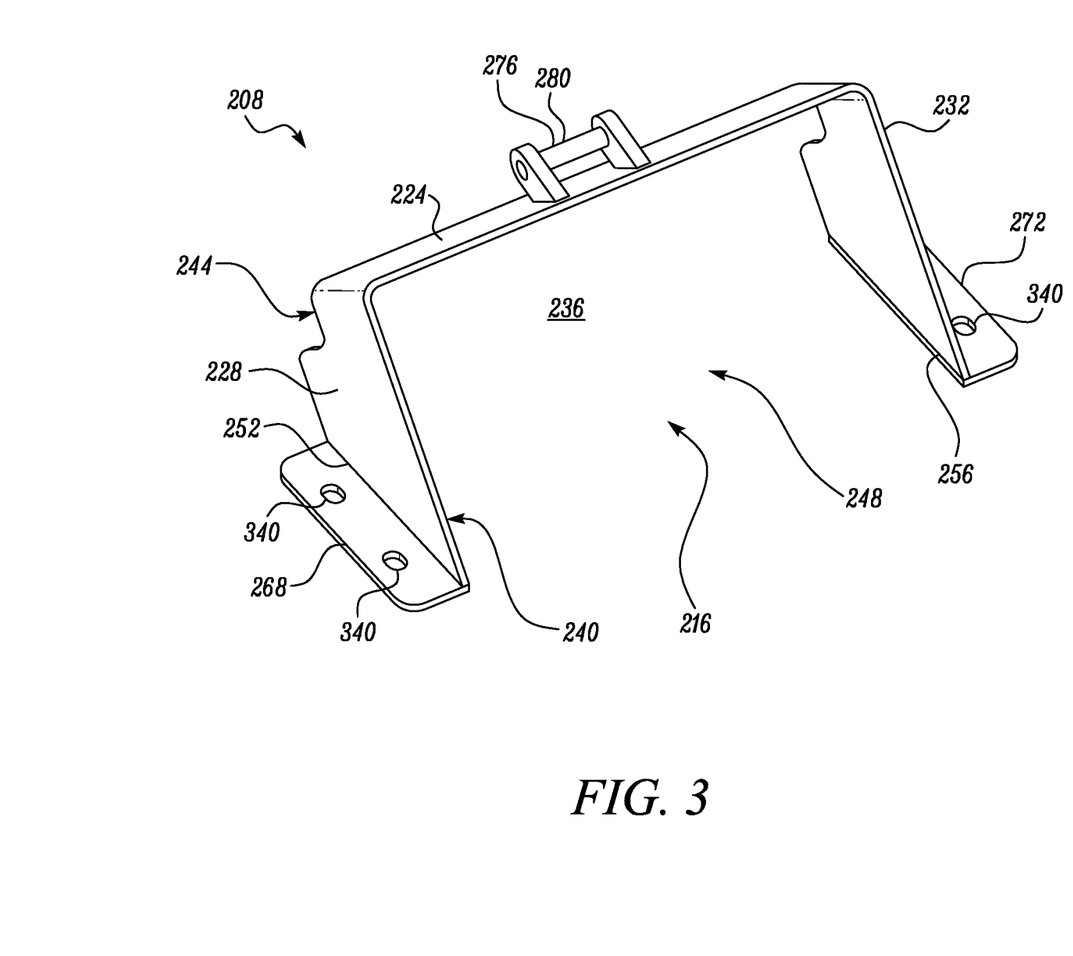
FIG. 3 is a perspective view of a bracket of the wheel chock mounting assembly, in accordance with one or more aspects of the present disclosure.
Figure 5:
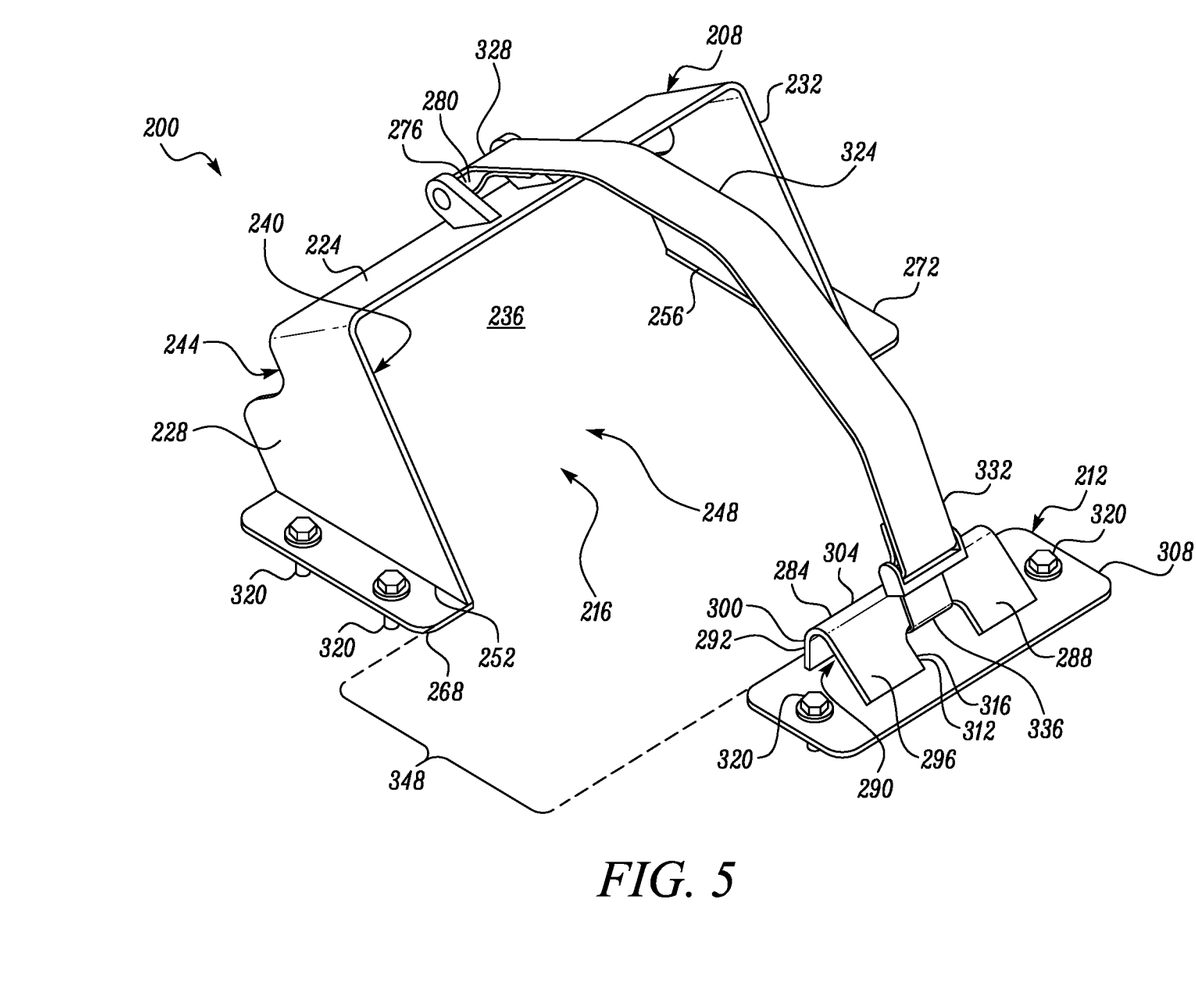
FIG. 5 is a perspective view of the wheel chock mounting assembly including a strap extending between the bracket and the stopper, in accordance with one or more aspects of the present disclosure.

Referring to FIGS. 3 and 5, the bracket 208 is configured to be coupled to the surface 184 of the fender 172 of the machine 100. According to one or more aspects of the present disclosure, the surface 184 defined on the fender 172 corresponds to the predefined location 202 on the machine 100. The bracket 208 defines a receptacle 216 to at least partially receive the wheel chock 204 at the predefined location 202. To this end, a profile of the receptacle 216 may match and/or be formed in conformity to a portion (e.g., a nose portion 220, see FIG. 6) of the wheel chock 204, so that the receptacle 216 may receive and accommodate said portion therein. The bracket 208 defines a base wall 224, and further defines a first side wall 228 and a second side wall 232 each of which extend from the base wall 224. The first side wall 228 and the second side wall 232 may be spaced apart from each other, and together, the base wall 224, first side wall 228, and the second side wall 232 may impart a U-shaped profile to the bracket 208 and/or to the receptacle 216 defined by the bracket 208—in this regard, it may be noted that the receptacle 216 may be defined by a space 236 partially encapsulated by the base wall 224, the first side wall 228, and the second side wall 232. In some embodiments, the first side wall 228 and the second side wall 232 may extend upright with respect to the base wall 224.

The base wall 224, the first side wall 228, and the second side wall 232, may be integrally formed, such as from a single, continuous piece of sheet metal. For example, such a sheet metal may define three sequentially arranged sheet metal portions disposed one after the other, and, to form the bracket 208, each sheet metal portion may be bent with respect to the consecutive sheet metal portion so as to arrive at the configuration of the bracket 208 discussed above. Alternatively, the bracket 208 may be made from one or more other materials, such as high grade plastics, polymers, or composites, either alone or in combination with each other, and the manner of making the bracket 208 from such other materials may be contemplated by one of skill in the art.

In some embodiments, the bracket 208, i.e., the base wall 224, the first side wall 228, and the second side wall 232, may combinedly define a first continuous edge end 240 and a second continuous edge end 244. The second continuous edge end 244 may be defined opposite to the first continuous edge end 240. As shown, the first continuous edge end 240 may define a mouth 248 of the receptacle 216 through which the wheel chock 204 (i.e., at least the nose portion 220) may be inserted and received into the receptacle 216.

The first side wall 228 and the second side wall 232 respectively define a first edge portion 252 and a second edge portion 256. Each of the first edge portion 252 and the second edge portion 256 may be configured to be abutted or seated against the surface 184 of the fender 172 to be coupled to the surface 184 of the fender 172. As an example, the first edge portion 252 and the second edge portion 256 may be each defined along a common plane 260 (see FIG. 6) and the base wall 224 may be disposed in a base plane 264, and, also, may be angularly disposed with respect to the common plane 260 such that a distance, D1, between the common plane 260 and the base wall 224 is larger at the first continuous edge end 240 than the distance between the common plane 260 and the base wall 224 at the second continuous edge end 244 (see FIG. 6).

According to some embodiments, the bracket 208 may define a first flange 268 and a second flange 272. The first flange 268 may be arranged at the first edge portion 252, while the second flange 272 may be arranged at the second edge portion 256. In some embodiment, the first flange 268 and the second flange 272 may be formed integrally with the bracket 208, as well, and may form part of the same sheet metal from which the base wall 224, the first side wall 228 and the second side wall 232 may be formed. Alternatively, the first flange 268 and the second flange 272 may be fastened (e.g., by welding) to the first edge portion 252 and the second edge portion 256.

Further, the bracket 208 may include a retention member 276 that may include a pin or a peg 280. The retention member 276 or the peg 280 may be arranged on the base wall 224 of the bracket 208, and may be disposed outwardly, i.e., away from the space 236 partially encapsulated by the base wall 224, the first side wall 228, and the second side wall 232 so as to save the receptacle 216 from any obstruction and from interference as and when the wheel chock 204 is inserted and received into the receptacle 216.

Figure 4:
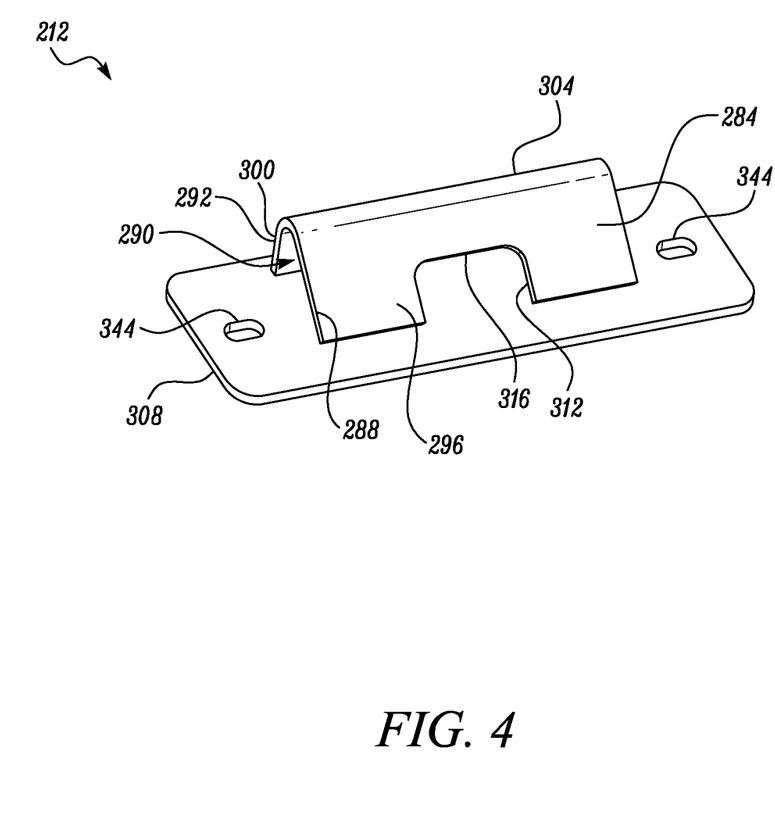
FIG. 4 is a perspective view of a stopper of the wheel chock mounting assembly, in accordance with one or more aspects of the present disclosure.

Referring to FIGS. 4 and 5, the stopper 212 includes a bent plate or a V-shaped plate 284. The V-shaped plate 284 defines a primary stem 288 and a secondary stem 292. The secondary stem 292 extends obliquely from the primary stem 288, as shown. The primary stem 288 and the secondary stem 292 define a V-shaped recess 290. The primary stem 288 defines a primary surface 296 and the secondary stem 292 defines a secondary surface 300. Both the primary surface 296 and the secondary surface 300 are directed away and outwardly of the V-shaped recess 290 defined by the V-shaped plate 284. Given the V-shaped configuration of the V-shaped plate 284, the primary surface 296 and the secondary surface 300 are disposed angularly with respect to each other, and meet each other at an edge 304, as shown, where the primary stem 288 and the secondary stem 292 meet, as well.

The stopper 212 is configured to be mounted to the surface 184 of the fender 172 of the machine 100 such that the secondary surface 300 is directed towards the receptacle 216 (i.e., towards the first continuous edge end 240 or towards the mouth 248 of the receptacle 216) and the primary surface 296 is directed away from the receptacle 216 (i.e., away from the first continuous edge end 240 or from the mouth 248 of the receptacle 216). Further, the stopper 212 may be mounted at a predefined distance from the bracket 208, with both the bracket 208 and the stopper 212 being structured and arranged to receive and constrain the wheel chock 204 therebetween at the predefined location 202 on the machine 100.

The primary surface 296 is configured to define a gradient, G, (see FIGS. 6, 7, and 8) with respect to the surface 184 to slope upwards towards the receptacle 216 (or towards the mouth 248 of the receptacle 216). In some embodiments, an angle defined by the gradient, G, with respect to the surface 184 may take any value within a range of 30-50 degrees. Further, the secondary surface 300 may be configured to extend upright (i.e., orthogonally) with respect to the surface 184, in some embodiments, the secondary surface 300 may define an angle with respect to the surface 184 anywhere within a range of 85-95 degrees.

The stopper 212 may further include a base flange 308. The base flange 308 may be coupled to the V-shaped plate 284, such that as the V-shaped plate 284 may be coupled or seated against the base flange 308 to assume an inverted configuration with respect to the base flange 308. In so doing, the edge 304 (defined at a junction where the primary surface 296 and the secondary surface 300 meet) may be directed away to be remote to the base flange 308. Further, the stopper 212 may include an engagement member 312 in the form of a notch 316. The engagement member 312 or the notch 316 may take the shape of a cutout formed on the primary stem 288. Said cutout may be disposed closer, and/or may be open towards the base flange 308, as shown.

Although not limited, the stopper 212 and the base flange 308 may be made from the same material as the bracelet 208 and may define the same general thickness and/or material specification as the bracket 208. If a metallic material is chosen to form the stopper 212, the V-shaped plate 284 may be welded to the base flange 308. Alternatively, if materials such as plastics, polymers, or composites, are chosen to form to the stopper 212, the stopper 212 may be formed by casting such materials in a single mold.

The wheel chock mounting assembly 200 may further include fasteners 320, e.g., six fasteners. Two of the fasteners 320 may be applied to be driven through the first flange 268 and be engaged with the second portion 192 of the fender 172 and so that the first edge portion 252 may be coupled and seated atop the surface 184 of the fender 172; and two of the fasteners 320 (not shown) may be applied to be driven through the second flange 272 and be engaged with the second portion 192 of the fender 172 and so that the second edge portion 256 may also be coupled and seated atop the surface 184 of the fender 172. In that manner, the bracket 208 may be coupled to the surface 184 of the fender 172. Further, two of the remaining fasteners 320 may be applied to be driven through the base flange 308 and be engaged with the second portion 192 of the fender 172 and so that the stopper 212 may be coupled and seated atop the surface 184 of the fender 172, as well, with the V-shaped plate 284 assuming an inverted configuration also with respect to the surface 184.

Referring to FIG. 5, the wheel chock mounting assembly 200 may further include a strap 324. The strap 324 may be coupled to each of the bracket 208 and the stopper 212 so as to be extended therebetween. As an example, the strap 324 may be made from a resilient material and may be stretchable and may be coupled and retained (e.g., fixedly or permanently by being wrapped around and sewn) to the peg 280 at one end 328 and at the other end 332, may include a hook 336. The strap 324 may be stretched so as to have its other end 332, with the hook 336, engage and couple (e.g., removably) to the engagement member 312 or the notch 316 of the stopper 212 to secure the wheel chock 204 between the bracket 208 and the stopper 212. Variation in the design and functioning of the strap 324 may be contemplated by someone of skill in the art.

INDUSTRIAL APPLICABILITY

During an assembly of the wheel chock mounting assembly 200 to the machine 100, an operator may first choose and locate the surface 184 of the fender 172 for the mounting of the wheel chock 204. Once the surface 184 is located, an operator may bring forth the bracket 208 and may position the bracket 208 atop the surface 184 such that the first edge portion 252 and the second edge portion 256 (or the first flange 268 and the second flange 272) may face or be directed towards and be seated or abutted against the surface 184. In so doing, the shaped profile of the bracket 208 may assume an inverted configuration with respect to the surface 184 or with respect to the second portion 192 of the fender 172. Also, in process, the operator may ensure that the mouth 248 of the receptacle 216 may be directed away or oppositely to the forward end 124 of the forward portion 116 of the machine 100.

Thereafter, the operator may bring forth the fasteners 320 and may fasten the first flange 268 and the second flange 272 against the surface 184 (e.g., two fasteners 320 for fastening the first flange 268 against the surface 184 and two fasteners 320 to fasten the second flange 272 against the surface 184). In this regard, holes 340 (see FIG. 3) may be provided in the first flange 268 and the second flange 272, and, correspondingly, openings (not shown) may be provided in the surface 184, such that the holes 340 may be aligned with the openings during the assembly to allow the fasteners 320 to be driven through the flanges (i.e., the first flange 268 and the second flange 272) and the surface 184 (or the second portion 192 of the fender 172). In that manner, the operator mounts the first flange 268 and the second flange 272 on the surface 184 and immovably couples the bracket 208 to the surface 184.

Once the bracket 208 is coupled to the surface 184, the operator may bring forth the stopper 212 and may place the stopper 212 on the fender 172 with its base flange 308 directed towards and seated on the surface 184 of the fender 172. Also, the stopper 212 may be placed at a predefined distance (visualized by space 348, FIG. 5) from the bracket 208—the term "predefined distance" may refer to a distance between the bracket 208 and the stopper 212, a maintenance of which causes the nose portion 220 of the wheel chock 204 to be nestled within the receptacle 216 and a portion of the wheel chock 204 to be disposed outside the receptacle 216 to abut and rest against the stopper 212 (see FIG. 8), when the wheel chock 204 is received and constrained in between the bracket 208 and the stopper 212.

Additionally, at this point, the operator may ensure that the secondary surface 300 is facing or is directed towards the mouth 248 of the receptacle 216 and the primary surface 296 is facing away from or oppositely to the receptacle 216. Thereafter, the operator may bring forth the two of the remaining fasteners 320 (out of the six fasteners) and may fasten the base flange 308 against the surface 184. To this end, holes 344 (see FIG. 4) may be provided in the base flange 308 and corresponding openings (not shown) may be provided in the surface 184, such that said holes 344 may be aligned with said openings to allow the two fasteners 320 to be driven through the base flange 308 and the surface 184 (or the second portion 192 of the fender 172). In that manner, the operator mounts the base flange 308 on the surface 184 and immovably couples the stopper 212 to the surface 184.

Further, the operator may bring forth and provide the strap 324, and may retain one end 328 of the strap 324 (e.g., fixedly by sewing) to the peg 280 of the bracket 208, and may stretch the other end 332 so that the hook 336 may be extended and brought into engagement with the notch 316 of the stopper 212. At this point, an exemplary assembly process involving the mounting of the wheel chock mounting assembly 200 to the machine 100 (or to the surface 184 of the fender 172 of the machine 100) at the predefined location 202 is attained.

Referring to FIGS. 6, 7, and 8, an exemplary mounting process of the wheel chock 204 to the wheel chock mounting assembly 200 is discussed. At first, the operator may unfasten the strap 324 by disengaging the hook 336 from the notch 316 to free up a space 348 (see FIG. 5) defined in between the bracket 208 and the stopper 212 for an entry of the wheel chock 204 into the space 348. Next, the operator may grasp the wheel chock 204 (e.g., the wheel chock 204 may include a handle by which it may be grasped or held by an operator, see FIG. 2) and may position the nose portion 220 to be inserted into the receptacle 216 over the stopper 212 or the edge 304 defined by the stopper 212 (FIG. 6). Once the wheel cock 204 is positioned in that manner, the operator may push the wheel chock 204 forward (see direction, A). A corresponding pushing action (i.e., direction, A) may be envisioned as being executed towards the forward end 124 of the forward portion 116 of the machine 100. At this point, the gradient, G, defined by the primary surface 296 may ease out and aid the pushing action. As the pushing is advanced, the nose portion 220 of the wheel chock 204 enters into the receptacle 216 (direction, B, see FIG. 7).

A continued push causes the wheel chock 204 to eventually fall and snap into the space 348 defined in between the bracket 208 and the stopper 212 (direction C, see FIG. 8), with a portion of the wheel chock 204 disposed outside the receptacle 216 abutting and resting against the secondary surface 300 (see FIG. 8). The generally upright extension of the secondary surface 300 with respect to the surface 184 (or with respect to the base flange 308) aids in retaining the wheel chock 204 within the space 348 and disallows the wheel chock 204 from slipping out of the space 348 under gravity.

Thereafter, the operator may pull over the strap 324 retained at the bracket 208 (or at the peg 280 of the bracket 208) to wrap over the wheel chock 204, stretch it towards the stopper 212, and extend the hook 336 so that it may be pulled further into engagement with the notch 316 defined by the stopper 212. In that manner, the wheel chock 204 may be mounted and secured into the wheel chock mounting assembly 200 (i.e., the wheel chock 204 may be secured between the bracket 208 and the stopper 212). Effectively, it may be noted that the bracket 208 and the stopper 212 are structured and arranged to receive and constrain the wheel chock 204 therebetween at the predefined location 202 on the machine 100. A process to remove the wheel chock 204 from the wheel chock mounting assembly 200 may be contemplated in reverse to said exemplary mounting process, discussed above.

The wheel chock mounting assembly 200 as defined by the components, i.e., the bracket 208, the stopper 212, and optionally the strap 324, is simple in construction, portable to handle, easy to assemble, and is effective in retaining the wheel chock 204 to the machine 100. Further, the location of the wheel chock mounting assembly 201) aids in enhancing human/operator comfort and ergonomics, in that neither is the chosen location on the fender 172 too high or too low for a human subject to access. Rather, the location meets the standards promulgated and set forth by various mandates and guidelines to mount and access one or more machine accessories, such as the wheel chock 204.

Moreover, the location of the wheel chock mounting assembly 200, as selected to be over the second portion 192 or the surface 184 of the fender 172, is a region of the machine 100 that remains largely free from any operational interference, e.g., engine exhaust and ventilation and electrical wirings. Furthermore, said location does not jut out of any machine panel such that it should unduly interfere with any of the machine 100's surroundings. Additionally, when the machine 100 may be executing a turn and/or when the forward portion 116 of the machine 100 may be at an angle with respect to the rearward portion 120, the second portion 192 of the fender 172 (and the wheel chock mounting assembly 200 positioned thereon) remains clear and away from interfering with the rearward portion 120.

It will be apparent to those skilled in the art that various modifications and variations can be made to the method and/or system of the present disclosure without departing from the scope of the disclosure, Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A wheel chock mounting assembly, comprising:
   a bracket having a retention member, the bracket configured to be coupled to a surface of a machine and defining a receptacle to at least partially receive a wheel chock at a predefined location on the machine; and
   a stopper having an engagement member, the stopper configured to be mounted on the machine at a predefined distance from the bracket, wherein
   the bracket and the stopper are structured and arranged to receive and constrain the wheel chock therebetween at the predefined location on the machine.

2. The wheel chock mounting assembly of claim 1 further including a strap having a hook at one end, the strap retained to the retention member at another end, and the hook is removably engaged with the engagement member to secure the wheel chock between the bracket and the stopper.

3. The wheel chock mounting assembly of claim 2, wherein the strap is made from a resilient material.

4. The wheel chock mounting assembly of claim 1, wherein the stopper defines a primary surface and a secondary surface, the primary surface and the secondary surface being disposed angularly with respect to each other, the stopper being mounted such that the secondary surface is directed towards the receptacle and the primary surface is directed away from the receptacle, the primary surface configured to define a gradient with respect to the surface of the machine to slope upwards towards the receptacle.

5. The wheel chock mounting assembly of claim 4, wherein the bracket defines a base wall, a first side wall and a second side wall extending from the base wall and spaced apart from each other, the receptacle being defined by a space encapsulated partially by the base wall, the first side wall, and the second side wall,
   wherein the base wall, the first side wall, and the second side wall, combinedly define a first continuous edge end and a second continuous edge end opposite to the first continuous edge end.

6. The wheel chock mounting assembly of claim 5, wherein the first continuous edge end defines a mouth of the receptacle to receive the wheel chock and the secondary surface is configured to be directed towards the mouth.

7. The wheel chock mounting assembly of claim 5, wherein the first side wall and the second side wall respectively define a first edge portion and a second edge portion each configured to be seated against the surface to be coupled to the surface,
   wherein the first edge portion and the second edge portion are each defined along a common plane and the base wall is angularly disposed with respect to the common plane such that a distance between the common plane and the base wall is larger at the first continuous edge end than the distance between the common plane and the base wall at the second continuous edge end.

8. The wheel chock mounting assembly of claim 1, wherein the bracket is configured to be coupled to a fender of the machine.

\* \* \* \* \*